J. E. KENNEDY.
AUTOMATIC TELLTALE FOR PNEUMATIC TIRES.
APPLICATION FILED DEC. 12, 1916. RENEWED SEPT. 19, 1919.
1,338,637.
Patented Apr. 27, 1920.
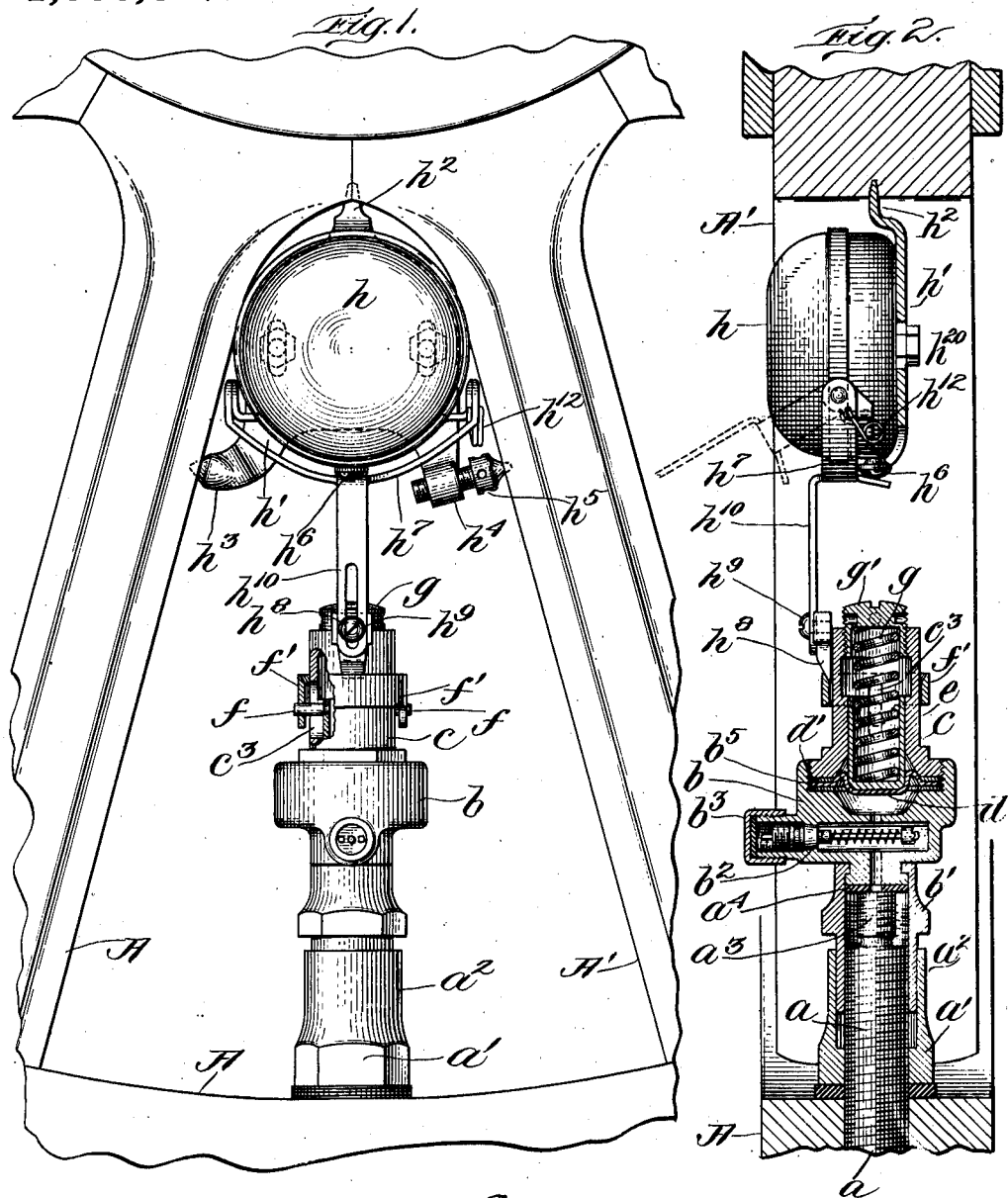
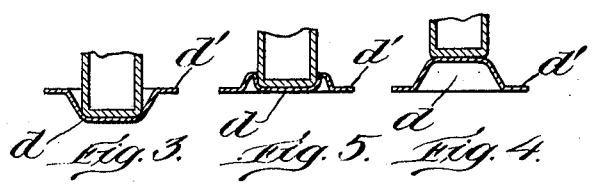

UNITED STATES PATENT OFFICE.

JOHN E. KENNEDY, OF GLENS FALLS, NEW YORK.

AUTOMATIC TELLTALE FOR PNEUMATIC TIRES.

1,338,637. Specification of Letters Patent. Patented Apr. 27, 1920.

Application filed December 12, 1916, Serial No. 136,580. Renewed September 19, 1919. Serial No. 325,038.

*To all whom it may concern:*

Be it known that I, JOHN E. KENNEDY, a British subject, resident of Glens Falls, New York, have invented certain new and useful Improvements in Automatic Telltales for Pneumatic Tires, of which the following is a specification.

This invention relates to pneumatic vehicle tires and is intended to provide for such tires, an automatic signaling device which shall act to notify the driver of a vehicle when the tire to which the tell-tale is applied has become deflated to a predetermined pressure below which it is desired that the pressure shall not fall.

The driving of a car after the air pressure in the tire has fallen below a certain degree of inflation is a very prevalent cause of rapid deterioration in the tire itself. To avoid this result, tire manufacturers usually specify an air pressure considerably higher than is really necessary for tire durability in order to leave a substantial margin of safety, since leakage from the tires may reduce the pressure to the damaging point without being apparent on casual inspection. If a positively reliable automatic signaling device be permanently attached to each tire it will be safe to maintain a much lower pressure in the tire than has heretofore been recommended, thus causing the car to ride more easily and at the same time prolonging the life or duration of the tire. It is obvious that unless the device be certain and reliable in its action and the signals are of such a nature as to make it virtually impossible for them to be overlooked or unnoticed, such a device would fail of its purpose and might even be misleading.

With these ends in view the present invention consists first in the combination with an automatic audible alarm or signaling device so coördinated with a pressure-controlled release mechanism that when the air pressure in the tire falls to a predetermined point the release mechanism is actuated to permanently release the alarm so that it continues to sound or ring until the automatic mechanism runs down. A second feature of the invention consists in the arrangement by which the valve stem is relieved of the weight of the alarm device which is supported directly on the wheel structure in operative relationship to the release mechanism connected with the valve stem, while at the same time the alarm is brought near the center of the wheel so as to affect the wheel balance the least possible and also keep it away from mud and slush.

These and other features of the invention will be particularly described and explained in the following specification and will be defined in the claims hereto annexed.

In the drawings I have illustrated a simple manner of applying the principles of this invention to the ordinary pneumatic tire such as is used on motor vehicles.

Figure 1 is a side elevation showing the device operatively mounted between two adjacent spokes of the wheel.

Fig. 2 is an elevation at right angles to the plane of Fig. 1, the lower part being shown in central section.

Figs. 3, 4 and 5 are detail cover sections showing successive positions of the flexible diaphragm before tire inflation, after tire inflation and before setting the automatic release device, and lastly in its normal operative position.

In the practice of my invention as illustrated in the drawings, the valve stem $a$ forming the inlet of the inner tube, is secured in the felly A of the wheel so as to project inwardly toward the center of the wheel in the usual manner and is clamped tightly in the felly by the nut $a'$ which in this case is formed with a tubular extension $a^2$ to form a protective shield for the coupling member $b'$ which is swiveled on the valve chamber $b$ and which has an internal screw-threaded connection with the exterior threads on the valve stem $a$ in order to draw the valve chamber $b$ firmly against the upper end of the screw threaded nipple $a^3$. A gasket $a^4$ is interposed between the opposing faces of said nipple and of the adjacent extension of the valve chamber to secure a tight joint. The inlet valve $b^2$ is mounted transversely of the valve chamber so as to permit the inflation of the tire without removing the automatic signaling device, the inlet end of said branch being provided with a screw threaded protective cap $b^3$.

The valve chamber member $b$ is formed with a vertical extension $b^5$ which is internally screw-threaded to receive the externally screw-threaded end of a casing $c$. An air-tight diaphragm or seal consisting in this case of a flexible cup-shaped diaphragm $d$ is mounted within the casing $b$ and is formed at its periphery with a lateral annular flange $d'$ which is adapted to be clamped against the inside shoulder of the valve chamber extension $b^5$ and the lower end of the casing $c$ in order to insure a tight joint between these two parts.

Above the flexible air-tight piston or diaphragm is mounted a loose tubular cap $e$ formed of metal or other suitable material whose outer end (that is toward the rim of the wheel) is closed and whose diameter is of proper size to loosely fit inside the casing $c$ and rest upon the elastic distensible member $d$.

The casing $c$ intermediate of its ends is provided with two longitudinal diametrically opposed slots $c^3$ through which pass the ends of connecting pins $f$ which connect the cap $e$ with an external sleeve or collar $f'$ encircling the casing $c$.

A spiral compression spring $g$ is mounted inside the cap or plunger $e$ so as to exert an outward thrust against the diaphragm or piston $d$, the inward thrust of said spring being received by an adjustable plug or set screw $g'$. It will thus be seen that the tension of the spring may be varied by the adjustment of the thrust member $g'$ and that the spring tension works in opposition to the air pressure against the diaphragm or piston $d$. This slidable collar $f'$ forms a holding and releasing mechanism for controlling the action of the alarm.

The preferred form of audible alarm or signaling device comprises an automatic bell $h$ such as is commonly used on bicycles and which have the well-known clock spring mechanism for automatically operating the clapper when the push button or plunger is moved in one direction or the other, and as this type of bell mechanism is commonly used and well known and forms no part of the present invention it is unnecessary to describe further details of structure. However, as these bells are of substantial weight I have made provision for supporting them directly on the wheel structure itself but in proper coöperating position to secure the desired action for my purpose.

In this case the bell $h$ is adjustably secured in a slotted holding plate or member $h'$ which is, roughly speaking, of triangular form comprising an upwardly pointed extension $h^2$ and lower laterally extending legs or arms $h^3$, $h^4$, the former of which is pointed to dig into a small recess in the spoke $A'$ of the wheel and the other arm $h^4$ being provided with a set screw $h^5$ having a pointed head adapted to be forced into the adjacent spoke $A'$. The slots in the plate $h'$ permit the bell to be adjusted radially of the wheel, the nuts $h^{20}$ serving to secure it in place.

The spring actuated plunger or button $h^6$ of the bell is arranged to release the bell ringing mechanism by its outward movement away from the center of the bell but this movement is normally prevented by a pivoted keeper or detent in the form of a bail $h^7$ which is provided with a slotted arm $h^{10}$ having a tongue $h^8$ which may be moved on arm $h^{10}$ and secured in any position of adjustment by means of the adjusting screw $h^9$ so as to adjust said tongue according to the normal location of the coöperating collar $f'$ which will vary according to the size or diameter of the wheel structure to which the device is applied.

The tongue chamber or detent $h^8$ has a radial point adapted to fit in between the ring or collar $f'$ and the casing $c$ so that the collar or sleeve acts to lock the tongue against swinging movement. It will be observed that the pivotal centers of the bail $h^7$ carrying the tongue are in an offset plane with relation to the button or plunger $h^6$, $h^6$ so that the outward movement of the button $h^6$ normally tends to swing the bail $h^7$ and its tongue or extension laterally outward as a visible sign of deflation beyond the line of the bell, such action being aided by a spring $h^{12}$. This movement is normally prevented by the collar $f'$ when it overlaps the tongue $h^8$.

The operation and use of the device is as follows: First, the attachment comprising the casing $c$ and the valve chamber body member $b$ are tightly secured to the valve stem in the manner already described, the spring $g$ being relaxed. The tire is then inflated through the inlet branch of the valve chamber in connection with a caliper or a pressure gage until the desired pressure is obtained, the diaphragm being forced to its uppermost position. The adjustable thrust plug or screw $g'$ is then turned until the collar $f'$ stands at approximately the middle portions of the opposed slots $c^3$ through which its connecting pins $f$ project, thus allowing a substantial clearance or play in both directions from the normal position with the spring $g$ balancing the air pressure. The alarm bell is then secured in the position between the spokes of the wheel by means of the set screw $h^5$. The tongue $h^8$ is then adjusted so that its projecting point will lie overlapped within the retaining sleeve or collar $f'$ when said sleeve or collar is at the intermediate position with relation to the slots $c^3$. The collar $f'$ is then pushed outwardly and then back into place to engage and retain the tongue $h^{10}$ in which position the bail or keeper $h^7$ is held so as to restrain the outward movement of the bell button $h^6$. The bell is then wound up in the usual manner by rotating its outer member while the controlling button $h^6$, being held against movement, prevents it from unwinding and ringing.

When the pressure falls sufficiently to disengage the collar $f'$ from the tongue $h^8$, the pressure of the button $h^6$ thrusts the tongue and bail laterally into position indicated by dotted lines at the same time releasing the bell spring and permitting the bell to ring continuously until the tension of the bell spring is entirely relieved.

It will be seen that with this structure and arrangement the bell must continue to ring until its bell spring is completely uncoiled even though the collar $f'$ should return to what would normally be locking position in relation to the tongue $h^8$. This is a very important feature because I have discovered that when the air pressure falls very gradually there is a tendency for the pressure-controlled piston or diaphragm to pulsate or jog up and down intermittently instead of steadily retracting, with the consequence that if a direct connection is made between the pressure-controlled member or detent and the bell-actuating mechanism the effect is to allow the bell to give relatively faint, intermittent rings until the bell spring is completely uncoiled and in such case the relatively weak sounds are likely to escape notice because the bell does not attain its normal loudness until its mechanism has acquired considerable momentum. Hence the employment of an independently movable intermediate member between the pressure-controlled detent and the actuating mechanism of the bell serves to prevent this disengaging and reëngagment of the detent with the bell mechanism which would render the device incapable of efficient and reliable service.

With a principle of arrangement characterizing this invention as soon as the air pressure falls to the predetermined point the keeper is permanently disengaged from its detent and the bell is allowed to ring to its maximum capacity regardless of any subsequent to and fro movement of the detent. Moreover the arrangement shown is such that the keeper is swung out from a relatively inconspicuous position to a conspicuous position shown in dotted lines in the drawing where it is likely to attract the notice or attention even in case of a very hasty inspection. This is important in case partial deflation should occur and the alarm rings when the car is at rest without any occupant.

While various forms of pressure-controlled diaphragm may be used there is a special advantage in the use of the cup-shaped or concavo-convex diaphragm of flexible material shown in the drawings. This concavo-convex form allows the flexible material to fold or buckle on itself to assume any position between the two extreme positions of movement without involving any extra tension or stretching of the material itself capable of substantially affecting the interaction of the opposing forces of the tension spring and the air pressure. Moreover the material, not being subjected to stretching or distention, will have greatly increased durability. It will be noticed that the upper and lower walls of the recess in which the diaphragm is mounted, act to support it against stretching at either extreme of its movement.

The partly diagrammatic Figs. 3, 4 and 5 illustrate the nature of the action of this form of diaphragm.

What I claim is:

1. An automatic tell-tale for pneumatic tires for wheels embracing in combination a hollow casing connected to the valve stem of the tire, a pressure-controlled member mounted to move on said casing, an automatically-actuated alarm mechanism mounted on the wheel in proximity to said casing, a movable keeper arranged to be held in position by engagement with said pressure-controlled member to prevent the actuation of the alarm mechanism to sound said alarm and normally movable out of engagement with said member when the tire pressure has fallen to a predetermined point in order to permanently release the alarm, substantially as described.

2. An automatic tell-tale for pneumatic tires for wheels embracing in combination a hollow casing communicating with and secured to the valve stem of the tire, a pressure-controlled member mounted to move on said casing when the air pressure in the tire falls, an automatically-actuated alarm device, a keeper mounted to normally engage said automatic alarm device to prevent it from sounding and to be engaged and held in such normal position by said pressure-controlled member, said keeper being movable away from the path of said pressure-controlled member and permanently disengaged from operative restraining position immediately upon release from said pressure-controlled member, substantially as described.

3. An automatic tell-tale for pneumatic tires for vehicle wheels embracing in combination a hollow casing whose interior is in communication with the interior of the tire, a movable piston member mounted in said casing in position to be exposed to air pressure of the tire, an opposing spring having adjustment for varying the tension of its resistance to the air pressure against said piston, a movable detent operatively connected with said movable piston, an automatically operated bell alarm mounted adjacent to said casing, a keeper normally held in position to lock the bell mechanism against action by engagement with said detent and movable out of position to be engaged by said detent when released there-from, said detent being positioned to release said keeper upon the fall of air pressure in the tire to a predetermined point.

4. An automatic tell-tale for pneumatic tires for wheels embracing in combination an automatic alarm bell, a supporting frame for adjustably securing said bell to the wheel structure adjacent to, but independently of, the valve stem of the tire, a keeper acting normally to prevent the automatic sounding of the alarm, a hollow casing secured to the valve stem and a movable member mounted thereon to normally engage and retain said keeper in position to prevent the sounding of the bell, said movable member acting automatically to release said restraining keeper when the air pressure in the tire falls to a predetermined point, substantially as described.

5. An automatic tell-tale for pneumatic tires for wheels embracing in combination a hollow casing connected with and carried by the valve stem of the tire, an alarm bell mounted on and secured to the wheel structure adjacent to said casing, a sliding pressure-controlled detent mounted on said valve casing, a swinging keeper adapted to be locked in normal position by engagement with said detent when the pressure in the tire is normal and to swing clear of said detent when the tire pressure falls to a predetermined point in order to indicate the fall in pressure and allow the alarm to sound, substantially as described.

6. An automatic tell-tale for pneumatic tires for wheels embracing in combination a hollow casing secured to and having external connection with the valve stem, a flexible diaphragm secured in said casing to be distended or moved one direction by the air pressure in the tire, an adjustable opposing tension spring arranged to yieldingly oppose the movement of said diaphragm, a detent mounted outside said casing to be moved in opposite directions by the diaphragm and by the spring, respectively, an audible alarm mechanism supported on the wheel structure adjacent to said casing and carrying a movable member for preventing the operation of the alarm, said movable member being normally engaged by said detent and automatically movable away from said detent when released, substantially as described.

7. An automatic tell-tale for pneumatic tires for wheels embracing in combination a hollow casing provided with means for securing an air-tight connection to the valve stem of the tire and having a lateral valved inlet port, an upward hollow extension, a movable collar surrounding said casing and controlled as to position longitudinally of the casing by the air pressure of the tire, an automatic alarm bell mounted adjacent to said casing, a pivoted keeper arranged to swing in position to engage and prevent the operation of the automatic alarm when engaged by said movable collar, said keeper being provided with an adjustment in order to permit its being properly coördinated with said retaining collar, substantially as described.

8. An automatic tell-tale for pneumatic tires for wheels embracing in combination an automatically operated alarm bell mechanism, means for normally preventing the operation of said mechanism, a detent for normally engaging said preventing means, a casing secured to the valve stem for operatively supporting said detent and means within said casing controlled by the air pressure of the tire for causing said detent to permanently disengage itself from said alarm preventing means when the internal air pressure falls to a predetermined point, substantially as described.

9. An automatic tell-tale for pneumatic tires for wheels embracing in combination an automatically operated alarm bell, a holding member adapted to be quickly secured to the wheel structure, adjustable fastening connections between said bell and said member, a movable keeper carried by said bell in position to lock its mechanism against operation, said keeper being automatically movable outwardly into a conspicuous position by said actuating mechanism when released and a detent operatively connected with the valve stem of the tire and normally maintained in operative relation to lock said keeper by normal pressure of air in the tire in position to prevent the sounding of the bell, the said keeper being released and moved to inoperative position when the air pressure falls to a predetermined point, substantially as described.

In witness whereof, I have subscribed the above specification.

JOHN E. KENNEDY.